(Model.)
N. P. CAPEHART & W. H. STEWART.
CULTIVATOR.
No. 250,782.   Patented Dec. 13, 1881.
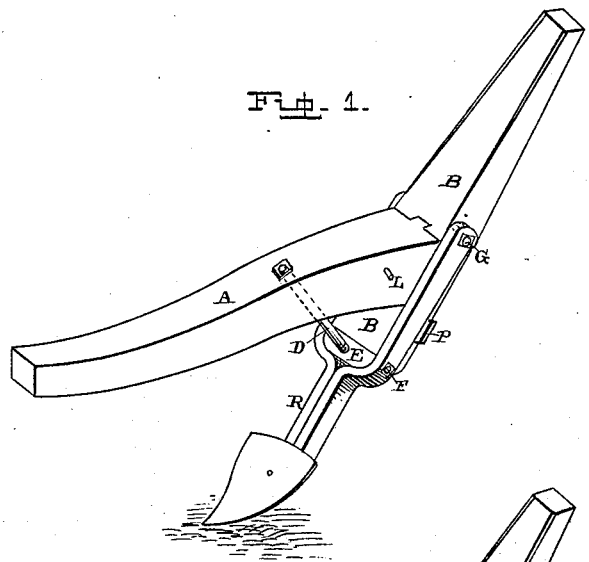
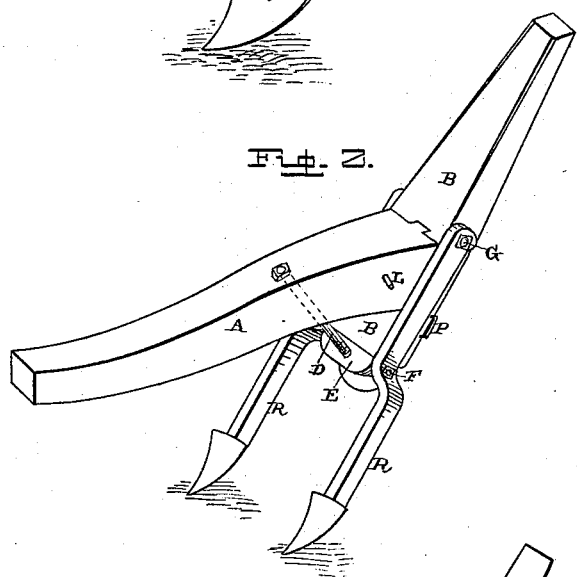
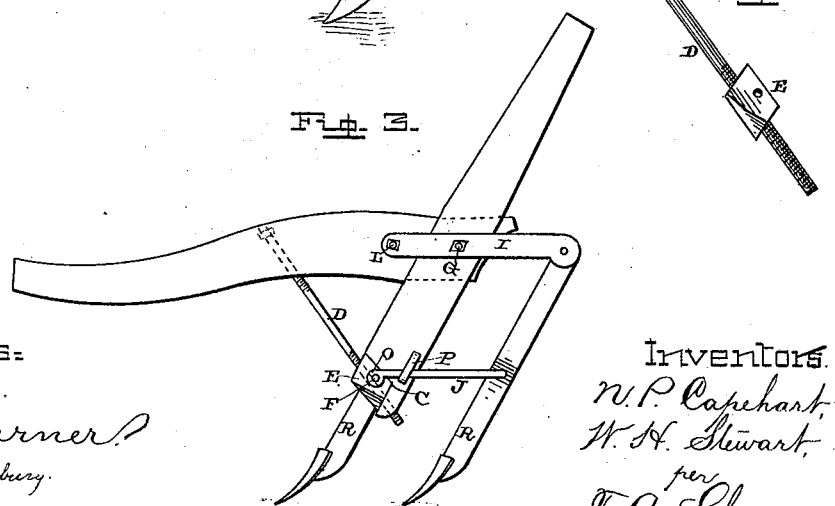
Witnesses:
J. W. Garner
P. D. Kingsbury
Inventors:
N. P. Capehart,
W. H. Stewart,
per F. A. Lehmann, Atty.

UNITED STATES PATENT OFFICE.

NEWTON P. CAPEHART AND WESLEY H. STEWART, OF LOUINA, ALABAMA.

CULTIVATOR.

SPECIFICATION forming part of Letters Patent No. 250,782, dated December 13, 1881.

Application filed September 16, 1881. (Model.)

*To all whom it may concern:*

Be it known that we, N. P. CAPEHART and W. H. STEWART, of Louina, in the county of Randolph and State of Alabama, have invented certain new and useful Improvements in Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in cultivators; and it consists in providing an attachment consisting of a bar and a hooked rod provided with an eye, which can be secured to either side of the beam and standard, so that one of the bent iron rods or bars can be taken off of its side of the beam and standard and transferred to the rear end and secured to the attachment, and thus made to run in the rear of the front bar or foot, whereby both shovels are adapted for plowing on one side only of the row of growing plants; and, also, in a block which is secured to an endwise-moving rod which is screw-threaded at both of its ends, one of the ends being passed through the beam and the other through the lower end of the standard, whereby the block can be adjusted back and forth, carrying with it the two feet, so as to cause them to run shallow or deep, as may be desired.

Figure 1 is a perspective of a cultivator embodying our invention, showing the bars adjusted so as to form a foot for a single shovel. Fig. 2 is a perspective showing the bars adjusted so as to form a straddle-row cultivator. Fig. 3 is a side elevation, showing the attachment in position and having both feet secured to it. Fig. 4 is a detached view of the block and the adjusting-rod.

A represents the beam, and B the standard, which is secured upon an extension which is formed upon the rear end of the beam, and which passes through a mortise that is made in the standard. The lower end of the standard has its front corner cut away so as to form a rabbet, C, and passing through this cut-away end and through the beam is the rod D, which is screw-threaded at both of its ends. Secured to this rod is a block, E, which corresponds in shape to the rabbet or cut-away portion of the standard, and which block is adjusted back and forth by nuts which are placed upon the screw-threaded ends above the top of the beam and in the rear of the lower end of the standard. By loosening the nuts at one end of this bolt and tightening up upon the nuts at the other end the rod carrying the block with it can be moved endwise to any desired degree.

Fastened upon the bolt F, which passes through the adjustable block, and fastened upon the bolt G, which passes through the standard, are the two bent iron rods R, which extend down below the lower end of the standard and form a foot for an adjustable shovel. These two iron bars or rods have their lower ends bent inward so as to bear against each other, as shown, and in between their lower ends are passed the bolts which secure the shovel in position. These two bars or feet being secured to the adjustable block so as to move with it as the block is adjusted back and forth, it is evident that when the block is adjusted the feet are moved with it so as to stand at a greater or less inclination, and thereby adjust the depth at which the shovel shall run.

When it is desired to form a double-shovel plow, as shown in Fig. 2, the two bolts which hold the two feet in position are withdrawn, the two feet are taken off, and then applied to opposite sides of the standard, so that their bent portions will extend outward from each other, instead of inward, as shown in Fig. 1. In this position each foot is provided with a separate shovel of its own, so as to plow upon opposite sides of the rows of growing plants, and they can be adjusted to run shallow or deep by simply adjusting the block back and forth.

When it is desired to secure both feet so as to form a side-row cultivator, so that one shovel will run in the rear of the other, it is necessary to use an attachment consisting of a bar, I, and a hooked lever, J. The two bolts which secure the two feet to the block and the standard are withdrawn, and then the foot upon one side is taken off and transferred to the rear end of the attachments. The bar is secured in position by having the bolt which passes through the standard pass through it and the top of the foot, which remains in position, but on the opposite side of the standard; and the front end of the bar is secured to the side of the beam by means of a bolt and nut, L, or any other suitable fastening. This bar then extends backward in a line, or nearly so, with the beam. The hook J has its front end, which is provided with an eye, O, passed through the staple P, which is secured near the lower end of the standard, and is then secured in place by means of the bolt which passes through the adjustable block. In this position the hook and the bar are ready to have the foot attached to them. The foot having a hole through its upper end, and this rod or bar also having a hole through it, the two parts are secured together by a short bolt and nut. The rear end of the bar is then passed through the hole through which the bolt which passes through the block was fastened, and the two feet are then secured in position and placed in such relation to each other that one runs behind the other, but having its shovel to run farther out from the plants than the front one. By means of this construction both feet are made to operate upon the same side of the row of growing plants.

It will be seen from the above construction that a cultivator having a single shovel, or having two shovels so as to run upon opposite sides of the plants, or a cultivator having two shovels so as to run upon one side only of the plants, can be produced at the will of the operator. When the two feet are placed so as to run upon the same side of the plants, they can be adjusted back and forth in the same manner as when a single shovel is used.

Having thus described our invention, we claim—

1. The combination of the beam and standard with the two feet, the connecting-bar I, and a hooked rod, J, provided with an eye, whereby the two feet can be secured so as to run one in the rear of the other, but upon opposite sides of the beam, substantially as described.

2. The combination of the beam and standard with a block which is secured to an endwise-moving rod, whereby the foot or feet, which are secured to the block, can be adjusted so as to run shallow or deep, substantially as set forth.

3. In a cultivator, the combination of the beam and standard with the endwise-moving rod, having secured to it a block, the two feet, and the pivoted bolt by which the feet are secured in position, substantially as specified.

In testimony whereof we affix our signatures in presence of two witnesses.

NEWTON PARSON CAPEHART.
WESLEY HARRIS STEWART.

Witnesses:
A. W. PINCKARD,
S. W. RICHARDS.